Figure 1:
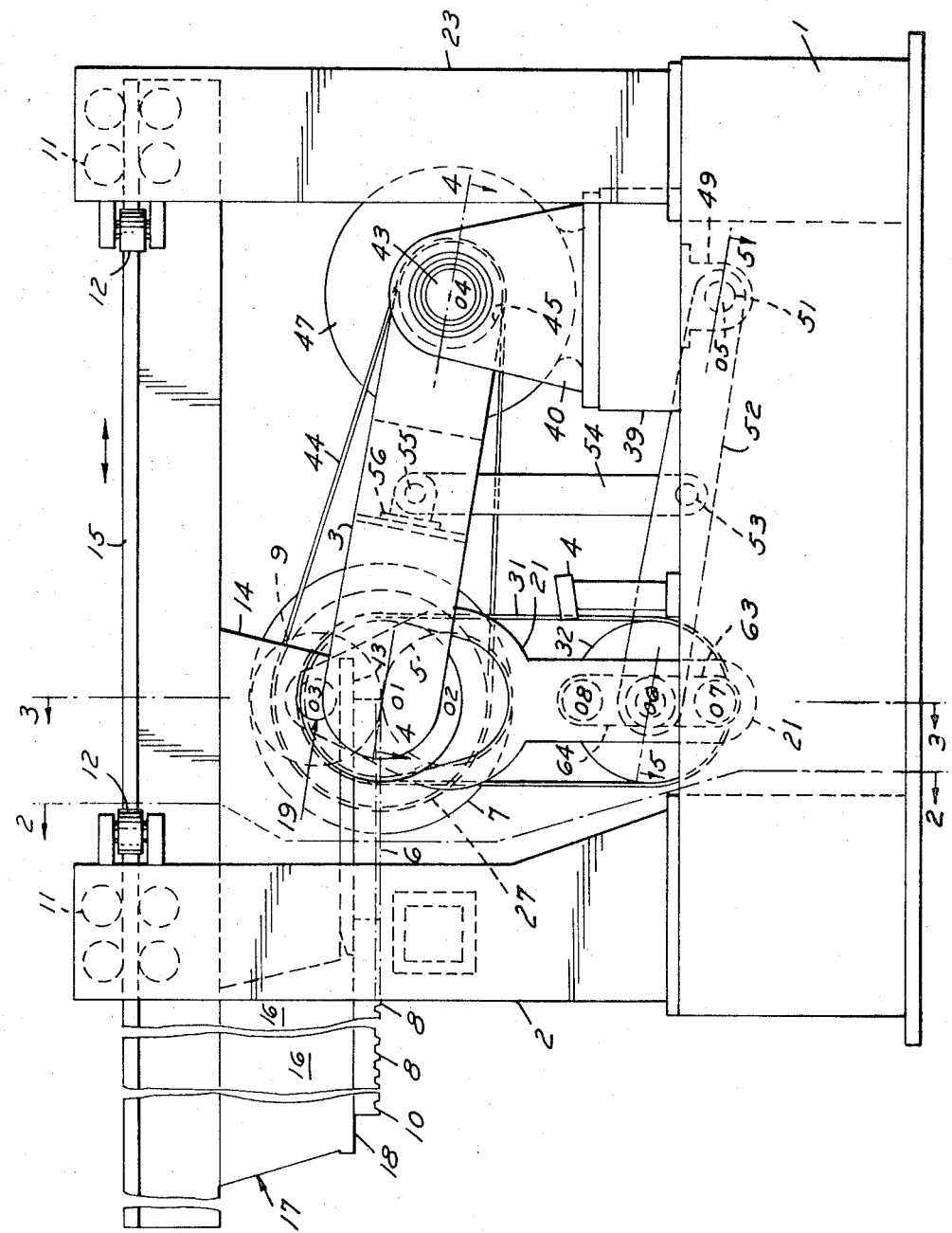

United States Patent [19]
Brems

[11] 3,745,838
[45] July 17, 1973

[54] RECIPROCATING DRIVE MECHANISM

[76] Inventor: John Henry Brems, 32867 White Oaks Trail, Birmingham, Mich. 48010

[22] Filed: Dec. 23, 1971

[21] Appl. No.: 211,263

[52] U.S. Cl. .................... 74/27, 408/135, 101/250
[51] Int. Cl. ............................................ F16h 21/02
[58] Field of Search ............... 74/27, 435; 101/250; 408/135

[56] References Cited
UNITED STATES PATENTS

| | | | |
|---|---|---|---|
| 2,489,712 | 11/1949 | Kelly | 74/27 |
| 1,150,785 | 8/1915 | Mouton et al. | 74/435 |
| 3,187,600 | 6/1965 | Seybold | 74/435 |
| 3,535,943 | 10/1970 | Miller et al. | 74/435 |
| 2,324,001 | 7/1943 | Kelly | 74/27 |

Primary Examiner—Manuel A. Antonakas
Assistant Examiner—Wesley S. Ratliff, Jr.
Attorney—Arthur Raisch, Robert A. Choate, et al.

[57] ABSTRACT

A mechanism for achieving a controlled motion in a path of travel which includes a carrier mounted to move in the determined path, a plurality of racks on the carrier extending in the direction of the path, and a plurality of gears to engage said racks selectively and consecutively to drive the carrier, one of the gears being mounted to rotate on a first axis while the others simultaneously revolve about the first axis, there being means to mount the gears such that the axis can move generally transversely of the path of travel while maintaining the gears in a position to engage the respective racks.

5 Claims, 20 Drawing Figures

CRANKS ℄ O-7 & O-8
SHOWN 90° OUT OF
POSITION ABOUT AXIS O-6

INVENTOR
JOHN HENRY BREMS
BY
Barnes, Kisselle, Raisch & Choate
ATTORNEYS

INVENTOR
JOHN HENRY BREMS
BY
Barnes, Kisselle, Raisch & Choate
ATTORNEYS

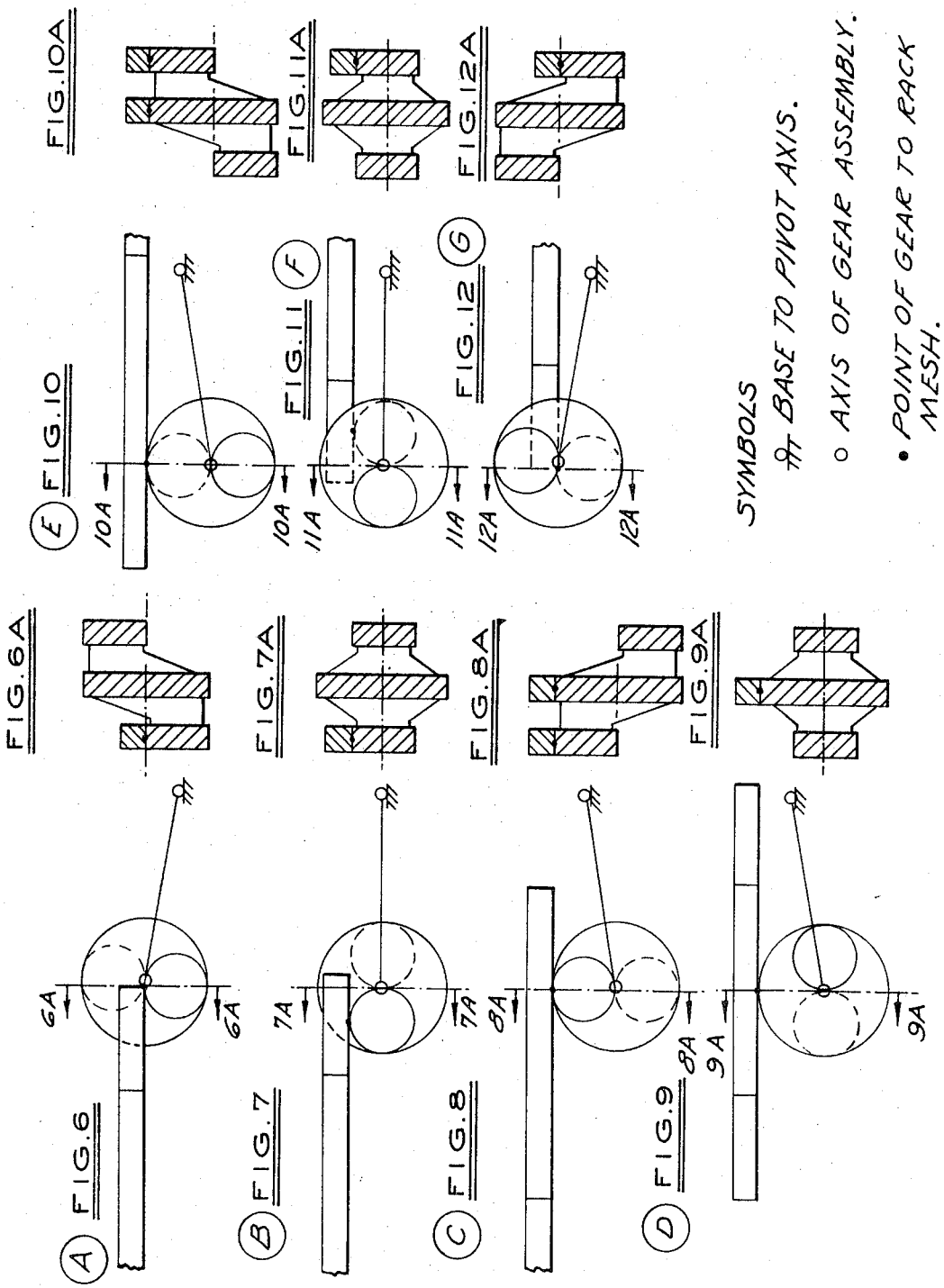

3,745,838

RECIPROCATING DRIVE MECHANISM

This invention relates to a Reciprocating Drive Mechanism.

It is an object of this invention to provide a smooth and shock free starting and stopping action for a reciprocating or multiple indexing table which has a defined straight path of travel or defined curvilinear motion.

It is an object to provide a mechanical accelerating and decelerating mechanism which is adaptable and adjustable to various strokes or indexing steps depending on the particular length desired.

It is a further object to provide a mechanism which has a fixed accelerating distance and a fixed decelerating distance with an independently variable constant velocity interval interposed between the accelerating and decelerating intervals.

It is a further object to provide a mechanism in which it is simple and inexpensive to change the constant velocity interval in an already existing mechanism.

This invention is a further development of the mechanism described in my copending application, Ser. No. 209,319, filed Dec. 17, 1971, which has nominally identical acceleration and deceleration characteristics but does not include the variable constant velocity characteristic during the center interval of travel.

It is a further object to provide a mechanism in which it is possible through the judicious choice of certain geometric parameters to modify the accelerating and decelerating characteristics of the mechanism while still maintaining smoothness and freedom from shock.

It is a further object to provide a mechanism in which it is possible to vary the dwell characteristics at the end of the stroke, or between the multiple indexes, through adjustment of another geometrical parameter.

It is a further object to provide an accelerating device in which the motor or cylinder type drive system is permitted to reach or approach its operating speed before it encounters the load of the indexing mass; similarly, the same device will decelerate the indexing mass to near zero before the motor brake or its equivalent is engaged, or before the cylinder reaches the end of its stroke, thereby relieving these mechanisms of any great stopping loads.

Other objects and features of this invention relating to details of construction and operation will be apparent in the following description and claims.

Drawings accompany the disclosure and the various views thereof may be briefly described as:

FIG. 1, a side elevation of the device showing the parts in their relative positions.

Figure 2:
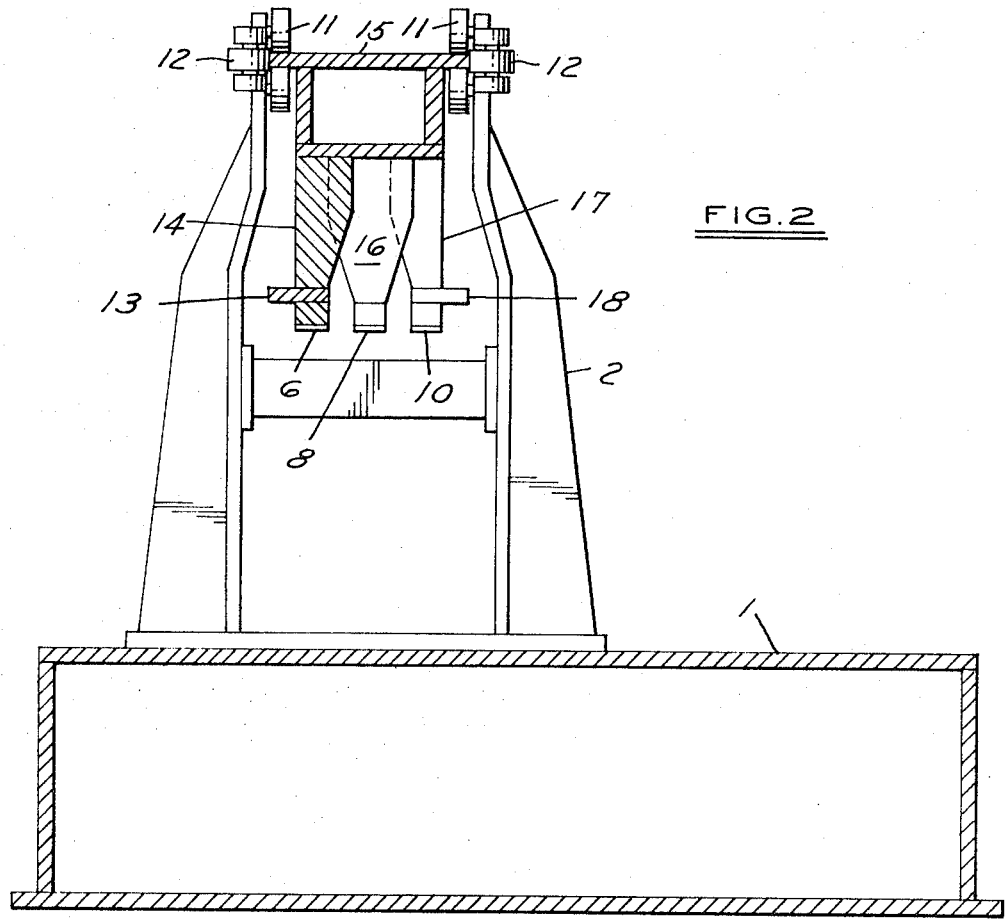

FIG. 2, a section through the device on line 2—2 of FIG. 1.

Figure 3:
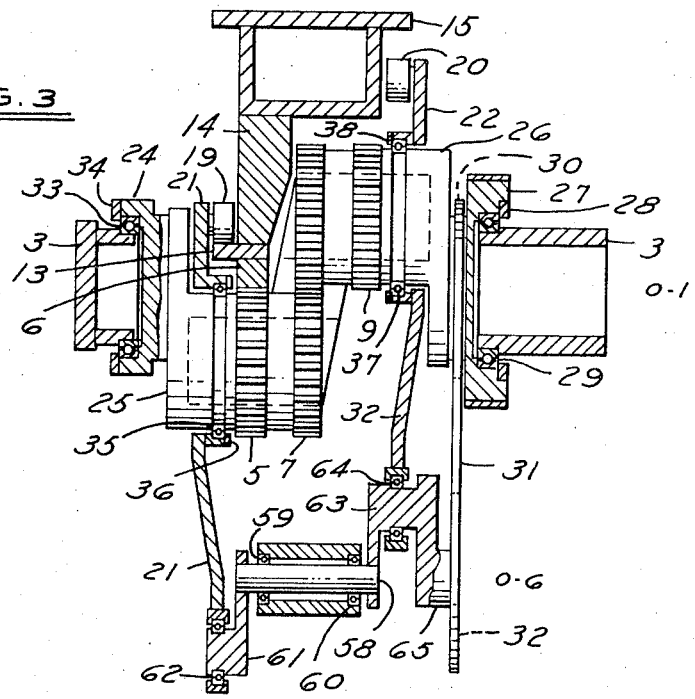

FIG. 3, a section through the device on line 3—3 of FIG. 1.

Figure 4:
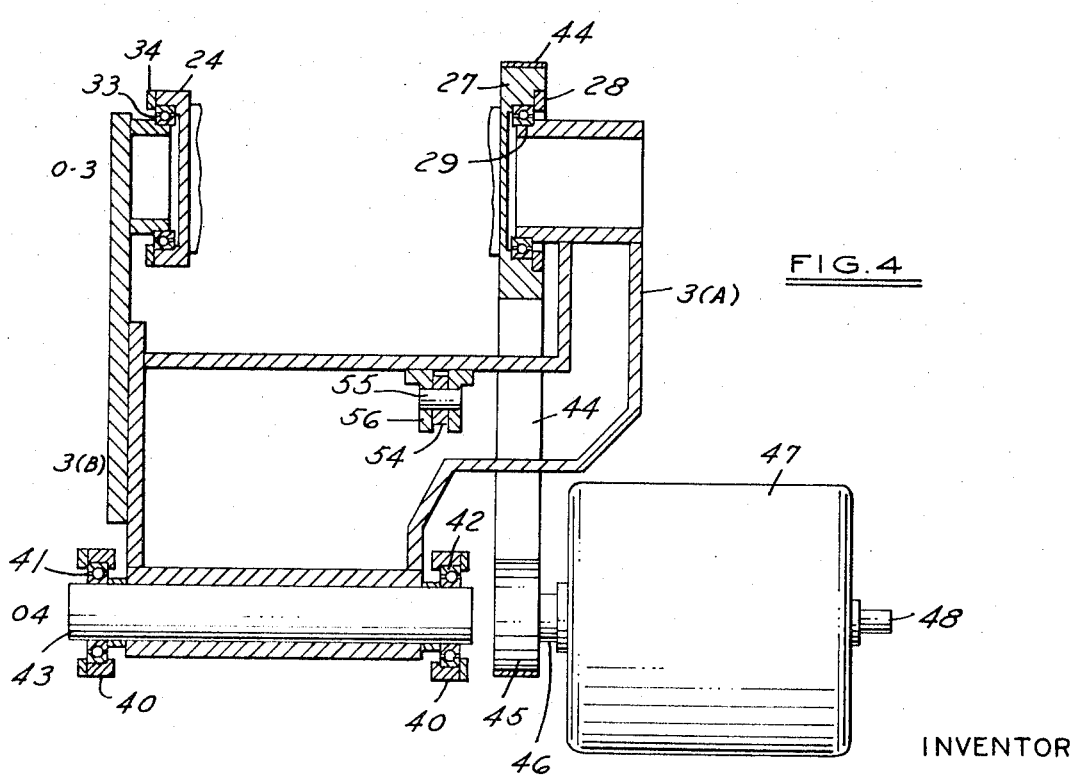

FIG. 4, a section through the device on line 4—4 of FIG. 1.

Figure 5:
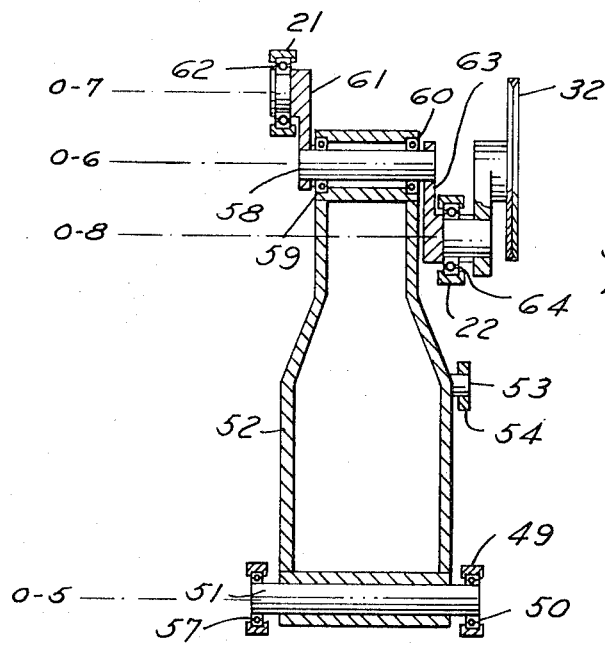

FIG. 5, a section through the device on line 5—5 of FIG. 1.

FIGS. 6 to 12 and FIGS. 6A to 12A, a group of schematic sketches showing, in line drawings, the progression of movement through a typical index cycle.

Figure 13:
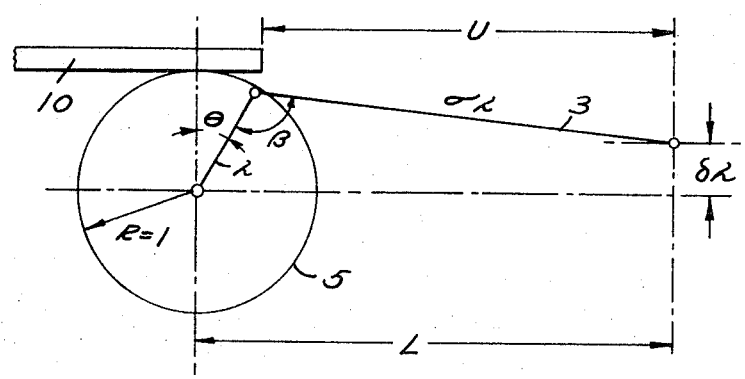

FIG. 13, a kinematic diagram indicating motion during acceleration and deceleration.

REFERRING TO THE DRAWINGS

In FIG. 1, a machine base 1 carries supporting brackets 2 and 23 mounted on both ends thereof. These brackets 2 and 23 in turn support a reciprocating member 15 through two sets of guide rollers 11 and 12 which support and guide the reciprocating member 15 along its path of travel.

The terminology of acceleration and deceleration as used in the following description applies to the action of the mechanism as the reciprocating member 15 moves from left to right. When the mechanism executes its reverse stroke from right to left, the terms acceleration and deceleration are interchanged.

On the bottom of the reciprocating member 15 (FIG. 2) are mounted three spacers 14, 16, and 17, which in turn support gear racks 6, 8 and 10. The gear rack 6 is suitably formed to mesh with a gear 5 and is used to accelerate the reciprocating member 15 to the right; gear rack 8 is suitably formed to mesh with a gear 7 and is used to move the reciprocating member 15 at constant velocity in either direction; gear rack 10 is suitably formed to mesh with a gear 9 and is used to decelerate the reciprocating member 15 at the end of the left to right stroke.

The following terminology applies to distinguish between axis and center: the axis about which a gear rotates is that line about which a gear is rotating even though that axis itself is moving in space. The center of a gear is its true geometric center which, in the case of gears 5 and 9, does not coincide with its axis. For gear 7 the axis and center coincide; for gears 5 and 9, the axis passes through or near the pitch line of the teeth.

Gears 5, 7 and 9 are rigidly connected together (FIG. 3) and in turn rigidly connected to a crank 25 and a hub 24 on one side, and rigidly connected to a crank 26 and a hub sprocket 27 on the other side. Hub 24 contains a bearing 33, held in place by retainer 34; hub sprocket 27 contains a bearing 29, held in place by retainer 28. The entire hub, crank, and gear assembly 34, 24, 25, 5, 7, 9, 26, and 27 rotates as a single rigid unit on bearings 33 and 29 on a pivoted bracket 3 (FIG. 1) about axis A.

It will be seen that gear 5 is in mesh with rack 6 during a portion of the movement of the device and the center distance between these two elements is maintained by spacer 21 connected by bearing 35, which is concentric to the center of gear 5, to crank 25; spacer 21 carries roller 19 which rolls on the upper surface of guide 13 mounted behind rack 6, thereby maintaining the required center distance (FIG. 3). Guide 13 is long enough to maintain this center distance only for that portion of the travel during which it is required.

Similarly, when gear 7 is in mesh with rack 8 during a portion of the movement, the center distance is maintained by having the pivoted bracket resting on the stop 4 (FIG. 1).

Likewise, during a portion of the cycle when gear 9 is in mesh with rack 10, the center distance is maintained by spacer 22 (FIG. 3) connected by bearing 37, concentric to the center of gear 9, to crank 26; spacer 22 carries roller 20 which rolls on the upper surface of guide 18 (FIGS. 2, 3) mounted behind rack 10. Again guide 18 is long enough to maintain this center distance only for that portion of the travel for which it is required.

The pivoted bracket 3 is supported (FIGS. 1 and 4) from the base 1 through a riser 39, clevis 40, bearings 41 and 42, and shaft 43 on axis D. This bracket 3 is free to oscillate about axis D as controlled by one of the three center distance systems described above.

The hub sprocket 27 on hub 26 is driven by chain 44, shown in dotted lines, and sprocket 45 mounted on an output shaft 46 of a gear reducer 47 (FIG. 4). It will be noted that the axis of the gear reducer output shaft 46 is coincident with the axis D of shaft 43 about which the bracket 3 oscillates. Therefore, the movement of bracket 3 about axis D causes no change in the center distance between sprocket 45 and hub sprocket 27.

The driving means for an input shaft 48 of the gear reducer 47 is not shown because many devices can be used with equal success. The input shaft 48 may be driven directly or through belts and pulleys by an electric motor, an air motor, or a hydraulic motor depending on the application. Suitable limit switches and controls using accepted techniques are utilized to start and stop the type of motor incorporated.

A second pivoted bracket 52, FIGS. 1 and 3, moves in exact parallelism with bracket 3. At its inboard end, bracket 52 is connected to the base 1 through shaft 51, bearings 50 and 57, and a clevis bracket 49. The bracket 52 is coupled to bracket 3 by connector link 54. Link 54 is connected to bracket 3 by two clevis brackets 56 and shaft 55; at its other end link 54 is connected to bracket 52 by stub shaft 53. Therefore, as bracket 3 moves up and down, bracket 52 moves in exact centerline synchronism.

At its outboard end, bracket 52 supports shaft 58 (FIG. 5) through bearings 59 and 60. Shaft 58 in turn carries crank 61 and crank 63 rigidly attached thereto. Crank 61 in turn supports bearing 62 mounted in an extension of spacer 21. The eccentricity of crank 61 is identical with the eccentricity of crank 25, FIG. 3, which is further identical with the eccentricities of crank 63 and crank 26.

The shaft 58 and cranks 61 and 63 are driven through a crank 65 and a sprocket 32 (FIG. 5). In FIG. 5, the cranks 61, 65 are shown 90° out of position from that shown in FIGS. 1 and 3. It will be noted that crank 65 mounted from crank 63 brings the centerline of sprocket 32 into concentricity with shaft 58. Sprocket 32, in turn, is driven by a chain 31 from sprocket 30 (FIG. 3). Sprockets 30 and 32 are identical in diameter; therefore, crank 61 can rotate in phase with crank 25, and crank 63 can rotate in phase with crank 26. This entire lower system based on bracket 52 is identical in terms of center distances and kinematics as the entire upper system based on bracket 3.

It is the purpose of crank 61 to provide a lower stabilizer point for spacer 21 such as to keep the line from the center of the roller 19 through the center of gear 5 always normal to the rack 6. Similarly, crank 63 provides a lower stabilizer point for spacer 22 such as to keep the line from the centerline of roller 20 through the centerline of gear 9 always normal to the rack 10 (See FIGS. 1 and 3). It will be noted that this function of the cranks 61 and 63 can be fulfilled by a variety of different positions for shaft 58 if compensating changes are made in the spacers 21 and 22. Indeed, a variety of other mechanical arrangements, such as double parallelogram links, can be used to maintain the desired orientation of the spacers 21 and 22. The function and operational intent of the mechanism can most easily be visualized through a series of schematic simplified sketches of FIG. 6. The movement will be described in one direction only. It will be understood that the return movement will be the exact inverse.

When the motor is started, the mechanism is in dwell as shown in FIGS. 6 and 6A. This causes the gear assembly to rotate clockwise about axis A. At this time gear 5 only is in mesh with rack 6; the other gears 7 and 9 are not in mesh with their associated racks. If the parameters are correctly chosen, the initial rotary movement of gear 6 causes the center line of the gear 5 to move to the left, the axis of rotation of the gear assembly moves downward and slowly causes the rack 6 to accelerate to the right. Since the spacers 21 and 22, and the stop 4 are omitted from these sketches, it should be assumed that these devices are performing their function of maintaining the proper center distance between each gear and its corresponding rack. As the clockwise rotation of the gear assembly continues, the rack 6 is smoothly and increasingly accelerated to the right, and the axis A continues moving downward. This is permitted by the bracket 3 pivoting about the fixed axis D.

After approximately 90° of clockwise rotation, as shown in FIGS. 7 and 7A, the axis A has moved downward until it is in the same horizontal plane as the center B of gear 5. At this point, the velocity of the rack 6 is approximately the same as the absolute peripheral velocity of the pitch line of the gear 5. Continued clockwise rotation of the gear assembly causes the axis A to move further downward and the rack to accelerate still more, though at a decreasing rate.

After approximately 180° of rotation of the gear assembly, as shown in FIG. 8, the axis A has reached the bottom of its movement and the rack 6 has reached its maximum velocity to the right and is moving approximately twice the peripheral velocity of the pitch line of the gear 5. The acceleration of the rack has returned to zero or near zero. As this point is approached, the gear 7 moves into mesh with rack 8; and as this point is reached, the gear 7 is in full mesh with rack 8. This is defined as the interchange point. If the gear diameters, gear relationships, and the rack relationships are properly chosen, the velocity and position of rack 6 generated by gear 5 will be identical with the velocity and position of rack 8 generated by gear 7 at this interchange point. Furthermore, through suitable choice of other parameters, to be described below, it becomes possible to make the acceleration of rack 6 in mesh with gear 5 zero at this same interchange point.

As the gear assembly continues its clockwise rotation, the gear 5 falls out of mesh with rack 6. This is permitted by the terminating ramp 13a on the guide 13 allowing the roller 19 to move downward as required by the now downward movement of the center B of the gear 5. The bracket 3 is now stationary and gear 7 moves the rack 8 to the right at true constant velocity, which is identical with the velocity reached at the interchange.

In FIG. 9, the gear assembly has rotated approximately 270° and gear 5 is completely clear of rack 6. Rack 8 is still moving at constant velocity as driven by gear 7. The amount of travel of this rack 8 is completely arbitrary, and is determined only by the length of rack 8 and the angular relationship between gear 9, which will be used for deceleration of the reciprocating system, and the gear 5. It should be noted that the gear 5 and gear 7 are mutually tangent to each other and to their corresponding racks at the interchange point.

Similarly, gear 9 and gear 7 are mutually tangent to each other and will be mutually tangent to their corresponding racks at their interchange point. The distance as measured along the pitch line of gear 7 from the tangency point of gear 5 to the tangency point of gear 9 corresponds to the length of constant velocity travel of rack 8; this is also the theoretical length of rack 8. In the drawings, gear 5 and gear 9 are shown approximately 180° apart; this position was completely arbitrary; it could just as well have been any other angular position. Furthermore, the length of constant velocity travel can exceed the pitch circumference of gear 7; for such an application, the gear 7 makes one or more revolutions before the second interchange takes place, and the spacing between gear 5 and gear 9 becomes the remainder of travel after an integral number of pitch circumferences of gear 7 have been subtracted from the constant velocity length.

The constant velocity travel continues, until, as shown in FIG. 10, gear 9 moves into mesh with rack 10. Guide roller 20 will at this same time come into contact with guide 18. At this second interchange point, the gear 7 will generate the same velocity and position in gear rack 8 as the velocity and position of rack 10 generated by gear 9. As the movement proceeds slightly past the interchange, rack 8 disengages from gear 7 and the output movement is controlled solely by gear 9 in mesh with rack 10. The axis A will start to move upward and the rack 10 will start to decelerate.

Still further rotation of the gear assembly, with gear 9 only in mesh with rack 10, causes the rack 10 to decelerate, until, as shown in FIG. 11, with approximately 90° of rotation remaining, the center of the gear 9 and the axis of rotation A are in the same horizontal plane. At this point, the velocity of the rack 10 has been reduced to the absolute pitch velocity of the gear 9.

Continued rotation of the gear assembly causes the axis A to return to its initial position as shown in FIG. 12. During this last interval of rotation, the rack 10 is smoothly decelerated to a stop, near stop, or slight reversal, depending on the exact geometrical relationships of the various parameters which are more fully described below.

It will be seen that during the first half (approximately) revolution of the gear assembly, the gear 5 in mesh with rack 6 smoothly accelerates the rack up to its maximum velocity. The acceleration starts from zero or near zero and ends at zero or near zero and reaches its peak near the middle of the acceleration interval. At the end of the acceleration interval, gear 7 meshes with rack 8 and the movement continues at constant velocity; after gear 7 meshes with rack 8, gear 5 disengages from rack 6. The length of constant velocity movement depends upon the length of the rack 8, and the phasing of the gears 5 and 9 relative to gear 7. At the end of the constant velocity movement, gear 9 meshes with rack 10, gear 7 unmeshes with rack 8 and the deceleration interval begins. This again requires approximately one half revolution of gear 9. The deceleration starts at zero or near zero, finishes at zero or near zero and reaches its peak at the approximate midpoint of the deceleration interval.

The foregoing presents a qualitative description of this device. A rigorous mathematical analysis of the device not only confirms these results but develops interesting and important interrelationships between certain geometrical parameters which permit the acceleration, velocity, displacement, and dwell characteristics of the device to be tailored to meet a variety of application requirements.

The initial objective of the mathematical analysis is to find that set of conditions which creates a dwell point of operation in which the velocity and acceleration of the reciprocating output member are both simultaneously zero or near zero.

The analysis to find this set of conditions concerns itself only with the accelerating gear 5, the decelerating gear 9, the link 3 and the position of the link 3 to frame pivot point axis 04. A kinematic diagram which illustrates the variables defined below is presented in FIG. 13.

The ratio of the accelerating gear 5 is arbitrarily defined as 1 for convenience of analysis.

The radius from the true geometric center of the accelerating gear 5 to its axis of rotation is defined as $\lambda$.

The length of the pivoted link or bracket 3 from the axis of accelerating gear rotation to the axis of the bracket mounting shaft 43 is defined as $\sigma\lambda$, which is to say the effective length of the longitudinal centerline of the bracket is $\sigma$ times as long as the radius $\lambda$.

$\theta$ is the angle between the normal to the rack at the gear tangency point and the radial line $\lambda$.

$\beta$ is the angle between the radial line $\lambda$ and the longitudinal centerline of the pivoted bracket 3, defined as $\sigma\lambda$.

$\delta\lambda$ is the distance that the bracket mounting shaft 43 axis is displaced towards the rack from a line parallel to and displaced from the pitch line of the rack, a distance equal to the radius of the accelerating gear 5, which is taken as 1.

As was the case with the single gear system described in my copending application, Ser. No. 80,841, filed Oct. 15, 1970, the object of the analysis is to find the values of $\theta$ and $\lambda$ for any given or assumed values of $\sigma$ and $\delta$ such that the velocity and acceleration of the rack are simultaneously zero or near zero, even though the accelerating gear 5 rotates at a constant angular velocity. Therefore, $dU/d\theta$ and $d^2U/d\theta^2$ are set equal to zero to find the desired solution.

Referring to FIG. 13, it can be shown that $$\frac{dU}{d\theta} = 1 - \lambda \left\{ \cos\theta + \frac{\sin\theta\,(\cos\theta - \delta)}{[\sigma^2 - (\cos\theta - \delta)^2]^{1/2}} \right\}$$

and $$\frac{d^2U}{d\theta^2} = \lambda \left\{ \sin\theta - \frac{\sigma^2\,[(\cos\theta - \delta)\cos\theta - \sin^2\theta] - \cos\theta\,(\cos\theta - \delta)^3}{[\sigma^2 - (\cos\theta - \delta)^2]^{3/2}} \right\}$$

At the extreme ends of the stroke, the system is governed and controlled solely by the accelerating and decelerating gear, link length, and link anchor position geometry. To this extent, the system behaves precisely at the ends of the stroke as though it were the single gear system described and discussed in my copending application, Ser. No. 80,841.

As described therein, the effect of placing the drive system on the pivoted link 3, whereby $d\beta/dt = 0$, and the interrelationships are found such that $dU/d\beta$ and $d^2U/d\beta^2$ are set equal to zero or near 0.

Similarly, the sprocket ratio between sprocket 45 and sprocket 27 is defined as $\epsilon$ and can be utilized to modify the shape of the acceleration and deceleration profile, and the analysis is again achieved through the utilization of the artificial angle $\psi$ defined as:

$$\psi = (1 - \epsilon) \beta + \epsilon \theta$$

Finally, the definition of the $K$ factor is made identical with that of the single gear system, i.e., $K = \lambda$ actually used in practice/$\lambda$ factor as calculated from the differential equations As before, the effect of the $K$ factor is very minor (for $K$'s very close to 1) on the velocity and acceleration characteristics of the system when not near the end dwells. At or near the center of the theoretical dwell, if the $K$ factor is made slightly greater than 1, the velocity of the rack will be very slightly negative at the point where the acceleration is zero, which in turn creates a very slight reversal of displacement which in practice results in a significant increase in the practical dwell.

In essence then, the multigear system described herein, for the incorporation of a constant velocity section between the acceleration and deceleration portions of the cycle, may be analyzed in identically the same manner as the single gear system described in the previously referenced application, Ser. No. 80,841, during the acceleration, deceleration, and end dwell portions of the cycle.

However, both theoretical and practical additional restraints are required to permit the introduction of the constant velocity gear or gear segment. These have to do with the conditions at the point of interchange and are described below.

At the point of interchange, it is necessary that the position of the accelerating rack generated by the accelerating gear correspond within a reasonably small amount to the position of the constant velocity rack generated by the constant velocity gear. This requires that the tooth positions for each gear and rack set be properly oriented for each specific design. It further requires that the rack lengths and positions be accurately controlled.

At the point of interchange it is also necessary that the instantaneous velocity of the accelerating rack generated by the accelerating gear be reasonably identical with the velocity of the constant velocity rack generated by the constant velocity gear. Any mismatch between these two velocities would create a step in the velocity profile and such a step requires a theoretically infinite acceleration which practically creates an undesirable impact.

To achieve matching of velocities, if both gears are rotating about a common axis, it is necessary that the distances from the center of rotation to their tangency points with their respective racks be equal. Since, for the constant velocity gear, this distance is perpendicular to the rack, both gears must be mutually tangent to each other at the interchange point.

If the radius from the center of the accelerating gear to its pitch line is taken as 1, and the radius from the center of the accelerating gear to the axis of rotation is $\lambda$, where $\lambda$ is a function of $\sigma$, then, to make the constant velocity gear, whose center is coincident with the axis of rotation, tangent to the accelerating gear, the radius of the constant velocity gear to its pitch line must be $1 + \lambda$. In the event a $K$ factor is used to modify the dwell characteristics, the radius of the constant velocity gear must be $1 + K\lambda$. This creates no theoretical difficulties but requires that the practical situation of maintaining an integral number of gear teeth on each gear be taken into consideration.

Another factor to be taken into consideration is the acceleration of the two racks at the point of interchange. By the basic design premise, the acceleration of the constant velocity rack at the point of interchange (and along every point of its travel) is zero. It is desirable but not necessary that the acceleration of the accelerating rack generated by the accelerating gear is also zero or near zero at the interchange point. In "Geneva" type devices, for comparison, the acceleration is generally near or at its peak at an interchange point, which causes a step in the acceleration profile. It is mechanically superior and far smoother to design mechanisms having no step or discontinuity in their acceleration profile. In this device it is theoretically possible to arrange the parameters to achieve this objective. It is accomplished by adjusting the input driving ratio ($\epsilon$ factor) such that the acceleration of the accelerating rack at the point of interchange is zero.

Another consideration concerns the kinematics of the internal subassemblies of the mechanism and not only of the output reciprocating member. Specifically, we must consider the motion of the pivoted bracket 3 and its slave bracket 52. It can be shown that the vertical movement of these brackets is approximately harmonic when an accelerating gear is in mesh with its corresponding rack. It will be noted that there is no movement when the constant velocity gear is in mesh with the constant velocity rack. Therefore, it becomes important that the interchange take place at that point where the vertical velocity of the pivoted brackets has reached zero or near zero; otherwise, a step or discontinuity arises in the velocity profile of these pivoted brackets with resultant shock to the mechanism. This requires that the angle $\theta$ be approximately 180°.

Variations which may be designed into this basic mechanism to achieve more flexibility are described below.

The pitch line of the racks need not be parallel to their line of movement, and such non-parallelism would modify the movement of the pivoted bracket. Furthermore, it is not necessary that the diameters of the accelerating gear and decelerating gear be the same diameter; this flexibility is useful in such applications in which it is desired that the accelerating length at one end of the stroke be different from that at the other end of the stroke. This would require either a non-circular gear for the center interval which would then no longer be a true constant velocity interval, or a circular gear for the center interval in which case the axis of rotation would no longer coincide with the center of the gear and again the center interval would no longer be true constant velocity.

In essence, these additional freedoms, when properly interrelated, will allow the design of specific systems in which the acceleration and deceleration are not equal, in which the center interval is not true constant velocity, and in which the dwell characteristics are not alike at each end. Applications which demand these characteristics are less common than those requiring the standard system as described, but the inherent flexibility of the invention may be utilized when required. If any of these variations are employed, the interchange conditions must be suitably modified.

In highly specialized cases, it may become advantageous to make one or more of the gears non-circular, providing still more kinematic flexibility.

In cases where the center interval requires less than one full revolution of that gear, it is not necessary to use a full gear, a sector of appropriate length being sufficient.

I claim:

1. A mechanism for achieving a controlled motion of a part in a path of travel comprising:
   a. a carrier,
   b. means to guide the carrier in a path of travel,
   c. means on said carrier forming a plurality of first drive surfaces extending in the direction of said path of travel, each spaced from the other in a direction transverse to the path of travel,
   d. a plurality of continuous curve, second drive surfaces spaced to respectively contact and engage said first drive surfaces, said second drive surfaces being mounted to move in concert each in a path wherein each selectively and consecutively engages a respective first drive surface to shift said carrier along said path of travel,
   e. said first drive surfaces comprising a plurality of racks mounted in parallel spaced relation on said carrier extending in the direction of the path of travel, and said second drive surfaces comprising a first main gear mounted to rotate about a first center, second and third gears on respective sides of said first gear mounted off-center from said first gear on second and third centers to revolve about said first center in concert with the rotation of said first gear, said gears being spaced to respectively engage one of said gears,
   f. means to mount said gears wherein they will respectively remain in contact with a respective rack while said centers are moving in a direction transverse to said path of travel,
   g. said means to mount said gears comprising an arm pivoted on a first axis perpendicular to the path of travel, said main gear being mounted to rotate on an axis on said arm parallel to but spaced from said first axis, and
   h. means acting on said arm to urge the arm toward said racks to maintain said gears in engagement with said respective racks.

2. A mechanism for achieving a controlled motion of a part in a path of travel comprising:
   a. a carrier,
   b. means to guide the carrier in a path of travel,
   c. means on said carrier forming a plurality of first drive surfaces extending in the direction of said path of travel, each spaced from the other in a direction transverse to the path of travel,
   d. a plurality of continuous curve, second drive surfaces spaced to respectively contact and engage said first drive surfaces, said second drive surfaces being mounted to move in concert each in a path wherein each selectively and consecutively engages a respective first drive surface to shift said carrier along said path of travel,
   e. said first drive surfaces comprising a plurality of racks mounted in parallel spaced relation on said carrier extending in the direction of the path of travel, and said second drive surfaces comprising a first main gear mounted to rotate about a first center, second and third gears on respective sides of said first gear mounted off-center from said first gear on second and third centers to revolve about said first center in concert with the rotation of said first gear, said gears being spaced to respectively engage one of said gears,
   f. means to mount said gears wherein they will respectively remain in contact with a respective rack while said centers are moving in a direction transverse to said path of travel,
   g. said means to mount said gears comprising an arm pivoted on a first axis perpendicular to the path of travel, said main gear being mounted to rotate on a second axis on said arm parallel to but spaced from said first axis, and
   h. means comprising cranks to support said arm in a position to maintain said gears in engagement with said respective racks.

3. A mechanism as defined in claim 1 in which a rotary drive means for said system comprises a pulley mounted to rotate on said first axis, a pulley on said arm on said second axis and belt means connecting said pulley to permit continuous drive while said arm moves in a pivotal motion around said first axis.

4. A mechanism as defined in claim 1 in which a rotary drive means for said system comprises a pulley mounted to rotate on said first axis, a pulley on said arm on said second axis and belt means connecting said pulley to permit continuous drive while said arm moves in a pivotal motion around said first axis, and a pulley drive on said arm on said second axis to drive a pulley on said cranks to synchronize motion of said cranks with pivotal motion of said arm.

5. An apparatus for transmitting rotary motion into an output motion of a part in a path of travel having a cycle of acceleration, constant velocity, and deceleration comprising:
   a. a support frame,
   b. an output member mounted on said frame,
   c. means to guide said output member in a path of travel on said frame,
   d. a rotating input member mounted on said frame,
   e. a first drive means connecting said input member to said output member to generate non-uniform motion of said output member comprising:
      1. a first drive surface on said output member,
      2. a first rotary member to engage said drive surface in a tangential drive relationship,
      3. a rotative drive member mounted for movement in a path generally transverse of said path of said output member,
      4. means mounting said rotary member in non-rotational relation to and on said drive member with the axes of said rotary member parallel but spaced from each other wherein power rotation of said drive member by said input member causes it to revolve about the center of said rotary member,
   f. a second drive means connecting said input member to said output member to generate uniform motion of said output member comprising:
      1. a second drive surface on said output member,
      2. means to associate said rotative drive member in driving engagement with said second drive member in a tangential drive relationship wherein rotation of said rotative drive member drives said output member in a uniform motion, g. a third drive means connecting said input member to said output member to generate non-uniform motion of said output member comprising:
1. a third drive surface on said output member,
2. a second rotary member mounted on said rotative drive member to engage said third surface with the axis parallel but spaced from the axis of said drive member, and h. means to maintain each of said respective drive surfaces in engagement sequentially with said first rotary member, said rotative drive member, and said second rotary member while each is rotating and revolving in response to motion of said input member.

* * * * *